(12) United States Patent
Park

(10) Patent No.: US 10,149,336 B2
(45) Date of Patent: Dec. 4, 2018

(54) VEHICLE AND WI-FI COMMUNICATION CONTROL METHOD THEREOF

(71) Applicant: Hyundai Motor Company, Seoul (KR)

(72) Inventor: Yunjoong Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 15/182,108

(22) Filed: Jun. 14, 2016

(65) Prior Publication Data

US 2017/0188402 A1     Jun. 29, 2017

(30) Foreign Application Priority Data

Dec. 28, 2015  (KR) .................. 10-2015-0187092

(51) Int. Cl.
| | | |
|---|---|---|
| *H04Q 7/00* | (2006.01) | |
| *H04W 76/14* | (2018.01) | |
| *H04W 24/08* | (2009.01) | |
| *H04W 52/24* | (2009.01) | |
| *H04W 52/44* | (2009.01) | |
| *H04W 16/10* | (2009.01) | |
| *H04W 52/28* | (2009.01) | |
| *H04W 84/12* | (2009.01) | |

(52) U.S. Cl.
CPC .......... *H04W 76/14* (2018.02); *H04W 16/10* (2013.01); *H04W 24/08* (2013.01); *H04W 52/243* (2013.01); *H04W 52/287* (2013.01); *H04W 52/44* (2013.01); *H04W 84/12* (2013.01)

(58) Field of Classification Search
CPC ... H04W 76/14; H04W 52/287; H04W 16/10; H04W 52/44; H04W 52/243; H04W 24/08; H04W 84/12
USPC .................................................. 370/329, 330
See application file for complete search history.

(56) References Cited

U.S. PATENT DOCUMENTS

| | | | |
|---|---|---|---|
| 7,430,400 B2 | 9/2008 | Russo et al. | |
| 2014/0079014 A1* | 3/2014 | Lee .................. | H04W 48/18 370/329 |
| 2014/0169212 A1* | 6/2014 | Villasenor ............. | H04W 28/18 370/254 |
| 2016/0174163 A1* | 6/2016 | Emmanuel ........... | H04B 17/336 370/329 |
| 2016/0249286 A1* | 8/2016 | Chen ..................... | H04W 48/20 |

FOREIGN PATENT DOCUMENTS

| | | |
|---|---|---|
| JP | 2014-529112 A | 10/2014 |
| JP | 2015-032968 A | 2/2015 |
| KR | 10-2012-0054929 A | 5/2012 |
| KR | 20120045339 A | 5/2012 |
| KR | 20130131720 A | 12/2013 |
| KR | 20140052423 A | 5/2014 |

\* cited by examiner

*Primary Examiner* — Chuong T Ho
(74) *Attorney, Agent, or Firm* — Mintz Levin Cohn Ferris Glovsky and Popeo, P.C.; Peter F. Corless

(57) ABSTRACT

A Wireless-Fidelity (Wi-Fi) communication control method of a vehicle includes: determining a Wi-Fi communication state of the vehicle at a current position; selecting a Wi-Fi channel having a low communication load according to the Wi-Fi communication state of the vehicle at the current position; and forming a Wi-Fi zone in the vehicle using the selected Wi-Fi channel.

17 Claims, 13 Drawing Sheets

FIG. 11
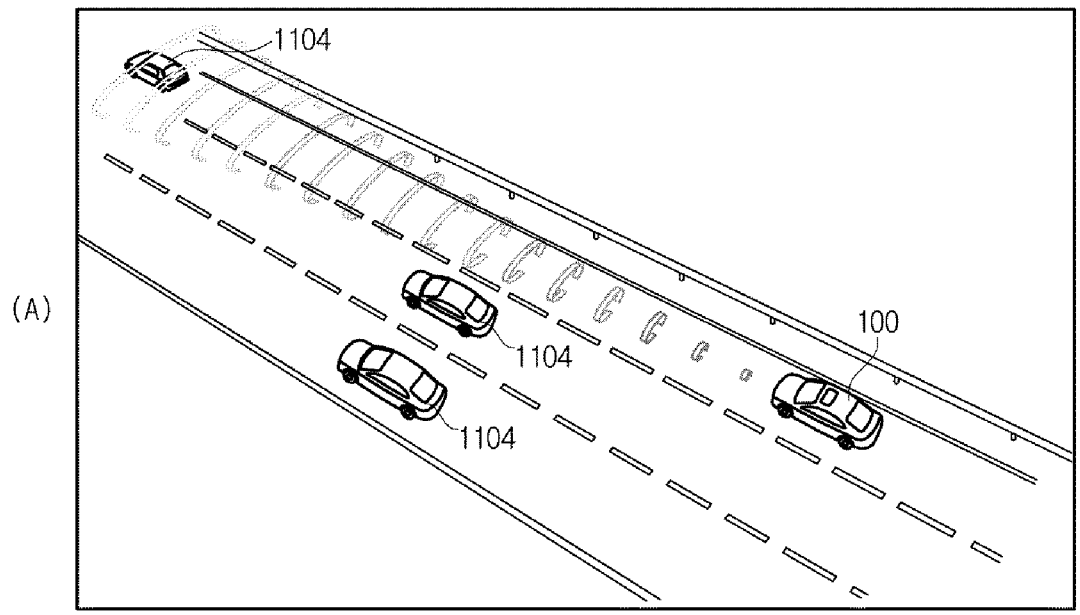
(A)
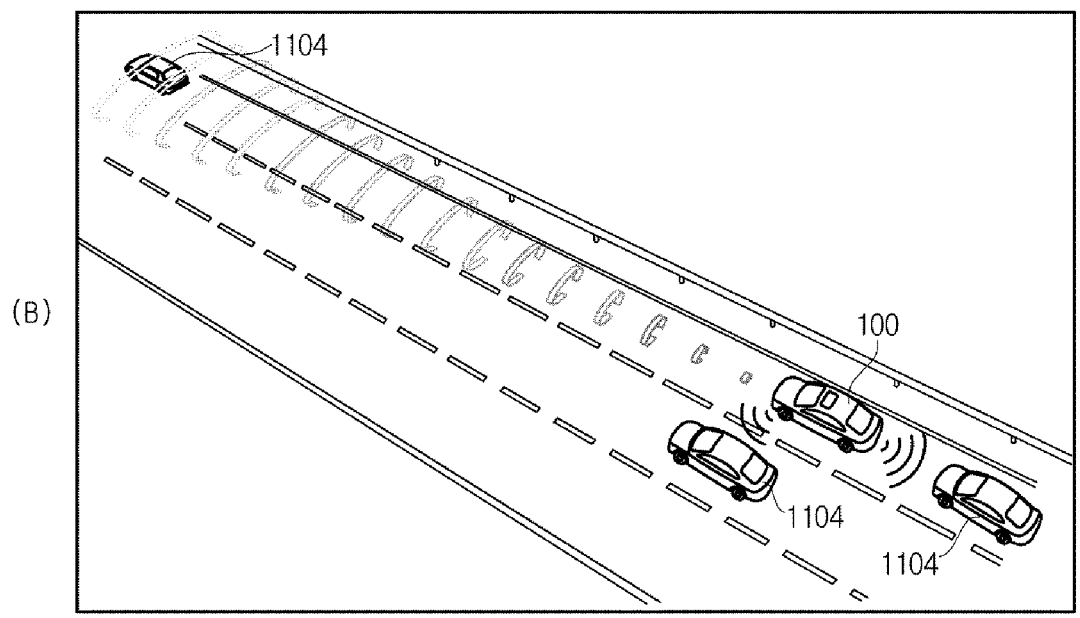
(B)

VEHICLE AND WI-FI COMMUNICATION CONTROL METHOD THEREOF

CROSS-REFERENCE TO RELATED APPLICATION

This application claims the benefit of and priority to Korean Patent Application No. 10-2015-0187092, filed on Dec. 28, 2015 in the Korean Intellectual Property Office, the disclosure of which is incorporated herein in its entirety by reference.

BACKGROUND

1. Technical Field

Embodiments of the present disclosure relate generally to a vehicle and, more particularly, to Wireless-Fidelity (Wi-Fi)-based communication control of a vehicle.

2. Description of the Related Art

As is generally known in the art, "telematics" is a compound word of telecommunication and informatics. A telematics system is a total information system in which wireless mobile communication (e.g., High Speed Downlink Packet Access (HSDPA) or Wideband Code Division Multiple Access (WCDMA)) and Global Positioning System (GPS) are combined with a variety of information. The emergence of the telematics system for a vehicle originates from the development and propagation of the Internet and the development of digital mobile communication technology.

Previously, vehicles represented a space where there is a void of information due to an absence of connectivity; however, such characterization has changed, and vehicles can now be a platform of mobile communication in which a variety of information thrives due to the emergence of telematics. Telematics systems organically connect a vehicle and a driver through a wireless network such that the driver uses a variety of information and services, such as the Internet, email, traffic information, telephone communication, route guidance (i.e., navigation), accident reporting, living information, theft detection (e.g., tracking stolen vehicles), and voice memo. Therefore, telematics allows a vehicle to become another "connected" living space.

In addition, a Wi-Fi zone may be formed in a vehicle when the telematics system provides a wireless Internet service. That is, a modem for wireless communication provided in a telematics unit can serve as an access point (AP) so that a Wi-Fi zone may be formed.

SUMMARY

It is an aspect of the present disclosure to form a Wi-Fi zone by selecting a channel having a lower communication load and taking a communication state of each Wi-Fi channel near a vehicle into account while forming a Wi-Fi zone. Additional aspects of the disclosure will be set forth in part in the description which follows and, in part, will be apparent from the description, or may be learned by practice of the disclosure.

In accordance with embodiments of the present disclosure, a Wi-Fi communication control method of a vehicle includes: determining a Wi-Fi communication state of the vehicle at a current position; selecting a Wi-Fi channel having a low communication load according to the Wi-Fi communication state of the vehicle at the current position; and forming a Wi-Fi zone in the vehicle using the selected Wi-Fi channel.

The determining of the Wi-Fi communication state may include determining an amount of use in each of a plurality of Wi-Fi channels.

The Wi-Fi communication control method may further include determining the amount of use in each of the plurality of Wi-Fi channels based on at least one of transmission power and a number of devices accessing each of the plurality of Wi-Fi channels.

The Wi-Fi communication control method may further include selecting a Wi-Fi channel among the plurality of Wi-Fi channels having a lowest amount of use.

The Wi-Fi communication control method may further include:, grouping n individual Wi-Fi channels adjacent to each other among the plurality of Wi-Fi channels to form a plurality of channel groups; selecting a channel group among the plurality of channel groups having a lowest amount of use; and selecting one Wi-Fi channel in the selected channel group.

In the Wi-Fi communication control method, n may be three; and the middle Wi-Fi channel among the three Wi-Fi channels in the selected channel group may be selected.

The Wi-Fi communication control method may further includes decreasing transmission power of the selected Wi-Fi channel when data use of a device accessing the Wi-Fi zone terminates.

Furthermore, in accordance with embodiments of the present disclosure, a Wi-Fi communication control method of a vehicle includes: determining whether the vehicle is running; determining whether another vehicle is near the vehicle when the vehicle is running; determining a Wi-Fi communication state of the vehicle at a current position when the vehicle is running and another vehicle is near the vehicle; selecting a Wi-Fi channel having a low communication load according to the Wi-Fi communication state at the current position; and forming a Wi-Fi zone using the selected Wi-Fi channel. When the vehicle is not running, the determining of whether another vehicle is near the vehicle is not performed.

The Wi-Fi communication control method may further include forming the Wi-Fi zone using a predetermined default Wi-Fi channel when the vehicle is running and there is no vehicle near the running vehicle.

The determining of the Wi-Fi communication state may include determining an amount of use in each of a plurality of Wi-Fi channels.

The Wi-Fi communication control method may further include determining the amount of use in each of the plurality of Wi-Fi channels based on at least one of transmission power and a number of devices accessing each of the plurality of Wi-Fi channels.

The Wi-Fi communication control method may further include selecting a Wi-Fi channel among the plurality of Wi-Fi channels having a lowest amount of use.

The Wi-Fi communication control method may further include: grouping n Wi-Fi channels adjacent to each other among the plurality of Wi-Fi channels to form a plurality of channel groups; selecting a channel group among the plurality of channel groups having a lowest amount of use; and selecting one Wi-Fi channel in the selected channel group.

In the Wi-Fi communication control method, n may be three; and the middle Wi-Fi channel among the three Wi-Fi channels in the selected channel group may be selected.

The Wi-Fi communication control method may further include decreasing transmission power of the selected Wi-Fi channel when data use of a device accessing the Wi-Fi zone terminates.

Furthermore, in accordance with embodiments of the present disclosure, a Wi-Fi communication control method of a vehicle includes: determining a communication state of each Wi-Fi channel of the vehicle at a current position; displaying each Wi-Fi channel and the communication state of each Wi-Fi channel using a display in the vehicle; receiving a selection of at least one of the displayed Wi-Fi channels; and forming a Wi-Fi zone using the selected Wi-Fi channel.

The selection of the at least one of the displayed Wi-Fi channels may be performed by a user touch.

The selection of the at least one of the displayed Wi-Fi channels may be performed by a user generating a sound of an identification factor corresponding to the at least one of the displayed Wi-Fi channels, and the identification factor may be input through a voice recognition method.

The determining of the Wi-Fi communication state may include determining an amount of use in each of a plurality of Wi-Fi channels.

The Wi-Fi communication control method may further include determining the amount of use in each of the plurality of Wi-Fi channels based on at least one of transmission power and a number of devices accessing each of the plurality of Wi-Fi channels.

The Wi-Fi communication control method may further include decreasing transmission power of the selected Wi-Fi channel when data use of a device accessing the Wi-Fi zone terminates.

Furthermore, in accordance with embodiments of the present disclosure, a vehicle includes: a Wi-Fi module performing Wi-Fi communication; and controller determining a Wi-Fi communication state of the vehicle at a current position, selecting a Wi-Fi channel having a low communication load according to the Wi-Fi communication state of the vehicle at the current position, and forming a Wi-Fi zone using the selected Wi-Fi channel.

The vehicle may further include a telematics unit in which the Wi-Fi module and the controller is provided.

Furthermore, in accordance with embodiments of the present disclosure, a vehicle includes: a Wi-Fi module performing Wi-Fi communication; and a controller determining a Wi-Fi communication state of the vehicle at a current position when the vehicle is running and another vehicle is near the vehicle, selecting a Wi-Fi channel having a low communication load according to the Wi-Fi communication state of the vehicle at the current position, and forming a Wi-Fi zone using the selected Wi-Fi channel. When the vehicle is not running, the determining of whether another vehicle is near the vehicle is not performed.

The vehicle may further include a telematics unit in which the Wi-Fi module and the controller is provided.

Furthermore, in accordance with embodiments of the present disclosure, a vehicle includes: a Wi-Fi module performing Wi-Fi communication; and controller determining a communication state of each Wi-Fi channel of the vehicle at a current position, displaying the communication state of each of the Wi-Fi channels using a display in the vehicle, receiving a selection of at least one of the displayed Wi-Fi channels, and forming a Wi-Fi zone using the selected Wi-Fi channel.

The vehicle may further include a telematics unit in which the Wi-Fi module and the controller is provided.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 is a view which shows a method which determines whether other vehicles are near a vehicle using a detection method provided in the vehicle;

Figure 1:
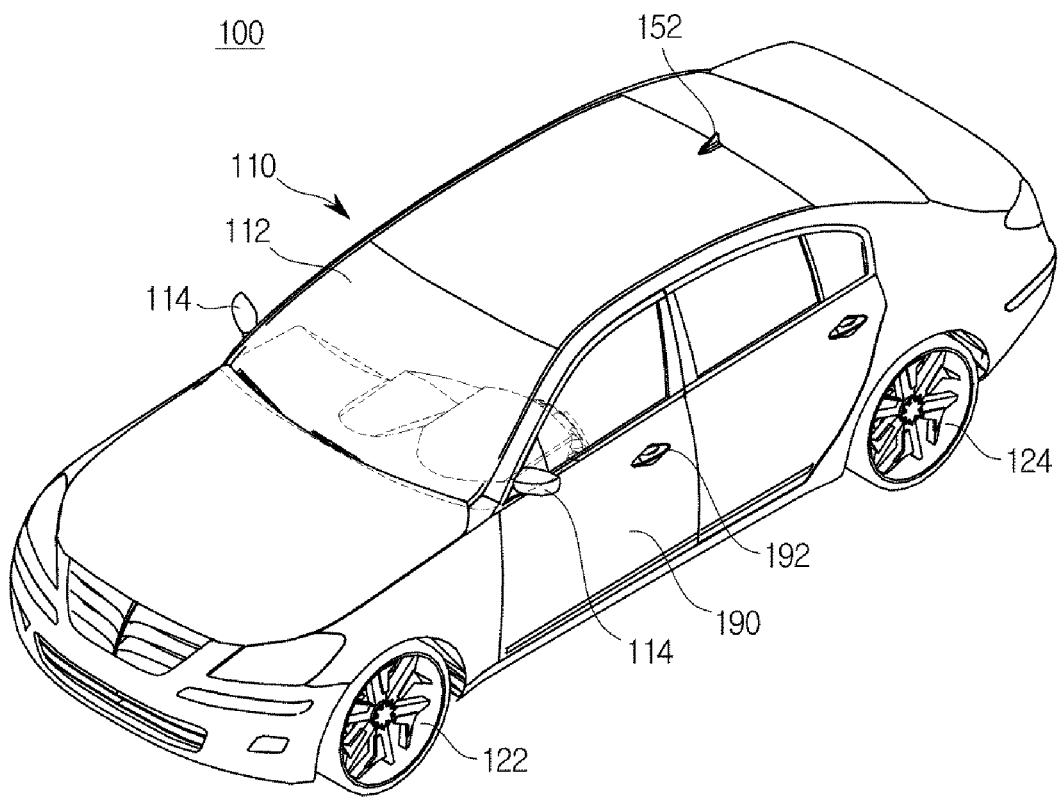
FIG. 1 is a view illustrating a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

Reference will now be made in detail to the embodiments of the present disclosure, examples of which are illustrated in the accompanying drawings, wherein like reference numerals refer to like elements throughout. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, FIG. 1 is a view illustrating a vehicle according to embodiments of the present disclosure. As is well-known in the art, the vehicle 100 shown in FIG. 1 may include a main body 110 forming an exterior of the vehicle 100, a windshield 112 for providing passengers with a field of view in front of the vehicle 100 and protecting the passengers from wind, outside mirrors 114 which provides views of vehicle sides and side and rear directions of the vehicle 100 for the passengers, doors 190 which shield an inner portion of the vehicle 100 from the outside, an antenna 152 for communication, front wheels 122 positioned at a front portion of the vehicle, and rear wheels 124 positioned at a rear portion of the vehicle.

The windshield 112 is provided at a front of each portion of the main body 110 such that passengers in the inner portion of the vehicle 100 can obtain visual information of the front of the vehicle 100. In addition, one outside mirror 114 may be provided at each of the left and the right of the doors 190. The passengers in the vehicle 100 may obtain visual information of the side of the vehicle, and the side and rear directions of the vehicle 100 through the outside mirrors 114.

The doors 190 are pivotably provided at the left and right sides of the main body 110 such that a passenger may go in and out through the doors when the doors are open, and the inner portion of the vehicle 100 may be shielded from the outside when the doors are closed. The doors 190 may be locked/released using door locking units 192. A user may lock/release the door locking units 192 using a method in which the user approaches the vehicle 100 and directly operates buttons or levers of the door locking units 192, or the user locks/releases the door locking units 192 using a remote controller and the like at a position away from the vehicle 100.

The antenna 152 is for receiving a broadcast/communication signals such as a telematics, Digital Multimedia Broadcasting (DMB), digital TV, or Global Positioning System (GPS) signal and may be a multifunction antenna which receives various kinds of broadcast/communication signals or a single function antenna which receives any one of broadcast/communication signals. It should be noted that the exterior arrangement of the vehicle 100 depicted in FIG. 1 is merely provided for demonstration purposes and should not be treated as limiting the scope of the present disclosure or of the claims defined herein.

Figure 2:
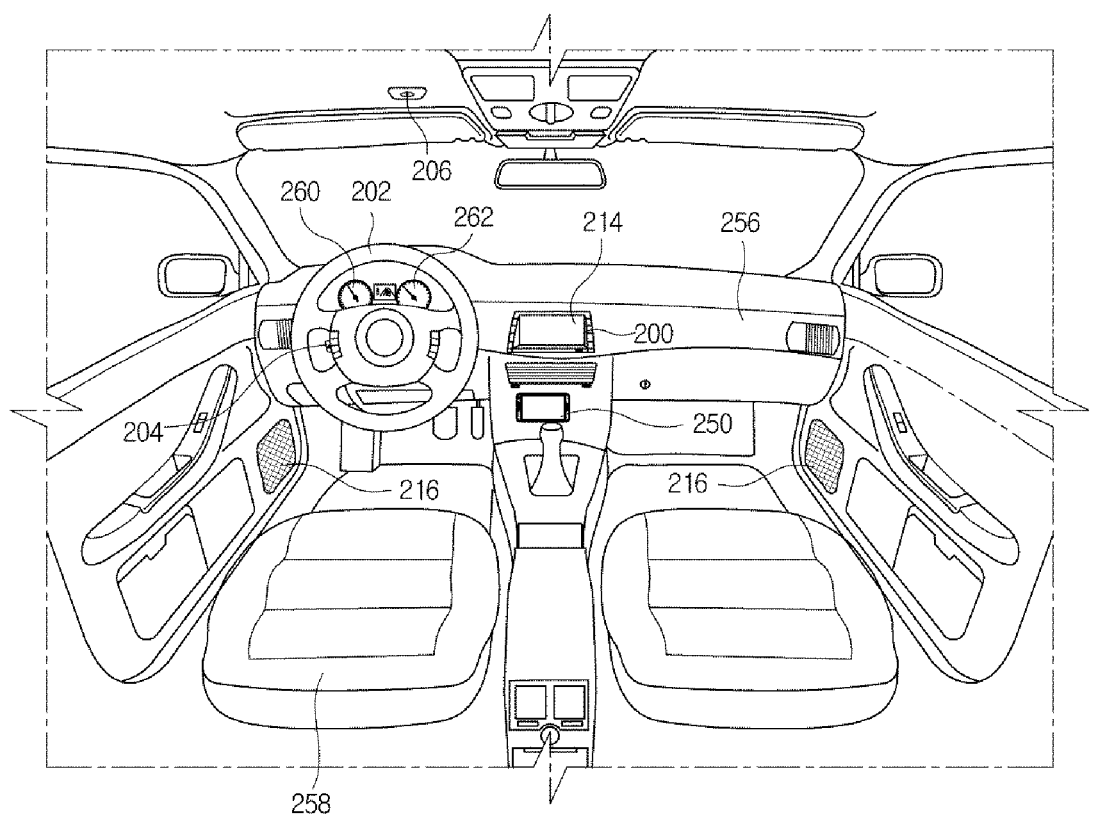
FIG. 2 is a view illustrating an inner portion of the vehicle in FIG. 1.

FIG. 2 is a view illustrating an inner portion of the vehicle in FIG. 1. As illustrated in FIG. 2, the inner portion of the vehicle 100 may include a dashboard 256 in which various devices with which a passenger operates the vehicle 100 are installed, a driver's seat 258 on which a passenger (e.g., driver) of the vehicle 100 sits, cluster displays 260, 262 which display operation information and the like of the vehicle 100, and an audio video navigation (AVN) 200 which is a multimedia device which performs various multimedia functions according to operation commands of the passenger. The AVN 200 performs a navigation function for route guidance, an audio function, and a video function.

The dashboard 256 is provided to protrude from a lower portion of the windshield 112 toward a passenger, and the passenger may operate various devices installed at the dashboard 256 while keeping eyes on the front.

The driver's seat 258 is provided at a rear of the dashboard 256 such that a passenger (driver) may drive the vehicle 100 while keeping eyes on the front of the vehicle 100 and various devices of the dashboard 256 with a stable posture.

The cluster displays 260, 262 may be provided on a side of the driver's seat 258 of the dashboard 256 and may include a speedometer 260 which displays a running speed of the vehicle 100, a revolution per minute (RPM) gauge 262 which displays a rotation speed of a power unit (not shown).

The AVN 200 may include a display 214 for displaying information of a road on which the vehicle 100 runs or a route to a destination to which a passenger wants to reach and speakers 216 which output sound according to the passenger's operation commands.

In addition, since the AVN 200 is capable of near field communication, the AVN 200 may perform information sending/receiving to/from an external device 250 that a passenger carries through the near field communication. To this end, the external device 250 also needs to be capable of the near field communication with the AVN 200. In addition, the AVN 200 may also be connected to the external device 250 through a wired communication method such as a universal serial bus (USB).

The AVN 200 may be operated based on voice recognition control. To this end, a voice recognition button 204 is installed on a steering wheel 202, and a microphone 206 is installed above the driver's seat. The voice recognition button 204, the microphone 206, the speakers 216, and the like may be used as auxiliary tools for the voice recognition control of the AVN 200.

In FIG. 2, the external device 250 which is an external device is connected to the AVN 200 to be capable of communicating with each other. The external device 250 which can be connected to the AVN 200 to be capable of communicating may include an external storage device such as an external hard disc drive (HDD), an external solid state device (SSD), and a universal serial bus (USB) memory as well as a mobile device such as a smartphone, or a tablet. In addition, an Internet of things (IoT) device or a streaming service provider may also be connected to the AVN 200 as an external device 250. The AVN 200 may receive multimedia contents from the external device 250 and display the multimedia contents through the display 214 of the AVN 200. It should be noted that the interior arrangement of the vehicle 100 depicted in FIG. 2 is merely provided for demonstration purposes and should not be treated as limiting the present disclosure or the scope of the claims defined herein.

Figure 3:
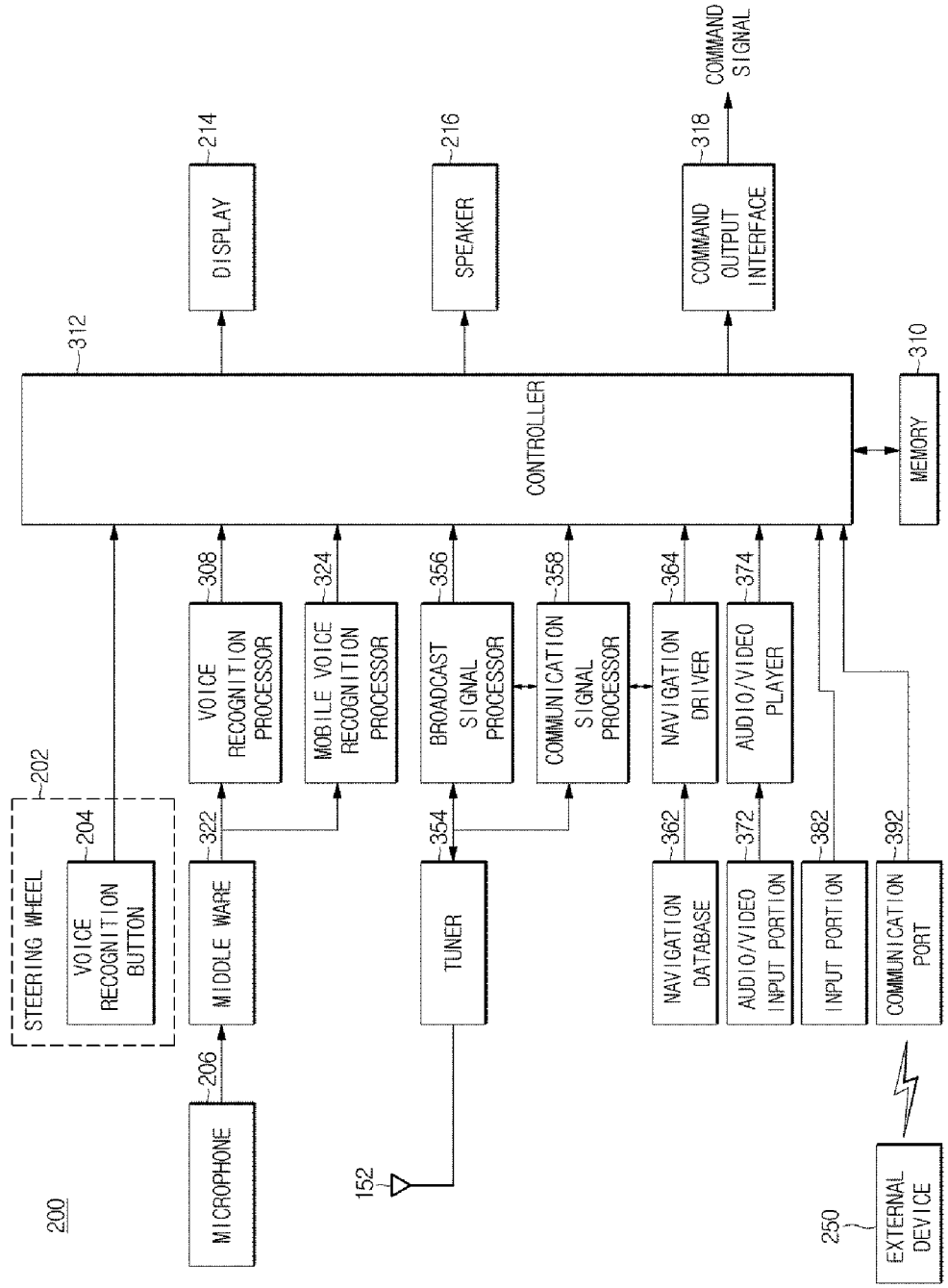
FIG. 3 is a view which shows a configuration of an audio visual navigation (AVN) of the vehicle according to embodiments of the present disclosure.

FIG. 3 is a view which shows a configuration of an AVN of the vehicle according to embodiments of the present disclosure. As illustrated in FIG. 3, a configuration of the AVN 200 may be mainly classified into a portion for a voice recognition function, a portion for a general input function, a portion for a broadcast/communication function, a portion for a navigation function, a portion for an audio/video function, and a portion which is commonly used for a plurality of other functions.

The portion for the voice recognition function includes the voice recognition button 204, the microphone 206, a middle ware 322, a voice recognition processor 308, and a command output interface 318. Although not a portion of the AVN 200, a mobile voice recognition processor 324 provided at a server positioned at a remote location may be connected to the middle ware 322 and a controller 312 to be capable of communicating through a mobile terminal 252 as an external device. The portion for the broadcast/communication function includes the antenna 352, a tuner 354, a broadcast signal processor 356, and a communication signal processor 358. The portion for the navigation function includes a navigation database 362 and a navigation driver 364. The portion for the audio/video function includes an audio/video input portion 372 and an audio/video player 374. The portion commonly used for a plurality of functions includes a memory 310, the controller 312, the display 214, and the speakers 216. The above-described classification based on the functions is not limited to the above-described components, and any one portion for one function may also be used for another function.

Through the voice recognition button 204, a passenger may perform and use multiple functions of the AVN 200 such as an audio function, a video function, a navigation function, and a data communication function. To this end, the voice recognition button 204 supports a one-key operation of a push-to-talk (PTT) method. The voice recognition button 204 may be installed at the steering wheel 202 such that a passenger conveniently operates even while driving. The steering wheel 202 is a steering system used for turning the wheels of the vehicle 100 in left or right directions to change a running direction of the vehicle 100. Since the passenger (driver) always grips the steering wheel 202 while driving, when the voice recognition button 204 is installed at the steering wheel 202, the passenger may conveniently operate the voice recognition button 204 while driving. Besides the steering wheel 202, the voice recognition button 204 may be installed at any position in the vehicle 100 as long as the passenger can easily operate the voice recognition button 204.

The microphone 206 receives a voice signal generated by a passenger while the voice recognition control function is functioning and converts the received voice signal into an electric signal. The microphone 206 may be a microphone provided for the voice recognition control, or a hands-free microphone of the vehicle 100 may be used in place thereof. In addition, the microphone 206 may be a microphone of a mobile terminal carried by the passenger. When the microphone of the mobile terminal is used, the mobile terminal and the AVN 200 are connected to each other using short-range communication such as Bluetooth.

The voice recognition processor 308 of the AVN 200 receives an electric signal converted by the microphone 206 through the middle ware 322, performs a voice recognition function for the converted electric signal, and extracts text data as voice command information as a result of the voice recognition. The text data extracted by the voice recognition processor 308 is transmitted to the middle ware 322 before being transmitted to the controller 312.

The middle ware 322 which is a relay tool, determines whether the text data transmitted from the voice recognition processor 308 of the AVN 200 is a reserved word for a voice recognition control of the AVN 200 or a reserved word for a voice recognition control of the mobile terminal 252. When the text data is a reserved word for the voice recognition control of the AVN 200, the middle ware 322 transmits the text data to the controller 312 of the AVN 200 to perform a voice recognition control of the AVN 200. On the other hand, when the text data is not a reserved word for the voice recognition control of the AVN 200, the middle ware 322 transmits the text data to the mobile terminal 252 so that a voice recognition control of the mobile terminal 252 is performed. That is, the middle ware 322 automatically determines whether a voice signal generated by a passenger is a reserved word for a voice recognition control of the AVN 200 or a reserved word for a voice recognition control of the mobile terminal 252 and relays them. During this process, an intentional intervention of a passenger for distinguishing a reserved word for the voice recognition control of the AVN 200 and a reserved word for the voice recognition control of the mobile terminal 252 is not needed.

The command output interface 318 is for transmitting a signal of a control command corresponding to voice command information extracted as a result of voice recognition to a device to be controlled from the controller 312.

The antenna 352 is a device for receiving radio waves from air or sending radio waves to air for the purpose of receiving a broadcast signal or sending and receiving a communication signal. The antenna 352 is connected to the tuner 354 to be capable of communicating. Accordingly, a radio wave that the antenna 352 received is transmitted to the tuner 354. The antenna 352 may be configured with a plurality of types of antenna for broadcast/communication signals of a plurality of different types. In embodiments of the present disclosure, the antenna 152 receives a DMB and receives/sends a telematics signal through methods of the third generation (3G), long term evolution (LTE), or the like.

The tuner 354 receives a radio wave that the antenna 352 receives and converts the radio wave into an intermediate frequency signal and the like. In addition, the tuner 354 converts a data signal to be sent into a type which can be radiated into the air and send it into the air through the antenna 352. That is, the tuner 354 performs an operation to only extract a signal of a specific band, to combine a carrier wave signal and a data signal, or the like. The tuner 354 receives a broadcast signal and sends or receives a communication signal. The broadcast signal may include a radio broadcast signal and a DMB signal. The communication signal may include a satellite communication signal of a Global Positioning System (GPS) satellite (hereinafter "GPS satellite"). In addition, the communication signal may include a communication signal for telematics. A signal to be received and processed by the tuner 354 is determined according to a control signal transmitted from the controller 312 to the tuner 354. For example, when the controller 312 sends a control signal to the tuner 354 to receive a radio broadcast signal of a specific channel, the tuner 354 receives the radio broadcast signal of a corresponding channel by responding to the control signal transmitted from the controller 312. When the controller 312 transmits a control signal and sends data for sending a telematics signal to the tuner 354, the tuner 354 responds to the control signal transmitted from the controller 312 to convert the data to be sent into a type which can be sent into the air and sends the converted signal into the air through the antenna 352. In addition, the tuner 354 obtains information of a broadcast channel included in a broadcast signal. The broadcast signal input into the tuner 354 includes the name of the broadcast channel, a service identification (ID), and broadcast data. The tuner 354 extracts the name of a broadcast channel, the service ID, and the broadcast data included in the broadcast signal and transmits them to the broadcast signal processor 356 and the controller 312 at the back end.

The broadcast signal processor 356 classifies a broadcast signal which passed through the tuner 354 into a video broadcast signal and an audio broadcast signal to perform a series of signal processing steps. The series of signal processings performed by the broadcast signal processor 356 may include an analog-digital conversion, a digital-analog conversion, or a conversion where video data are converted into a signal type which can drive the display 214, etc.

The communication signal processor 358 performs processing of communication signal with GPS satellites and telematics communication signal. That is, the communication signal processor 358 converts received communication signals into a data type for transmitting them to the controller 312 or receives data which are sent through the tuner 354 and the antenna 352 from the controller 312 to convert into signals of a type capable of communicating.

The navigation database 362 includes data for implementing navigation. The navigation database 362 may have a type of a memory card or a digital video disc (DVD). In addition, navigation data provided from a mobile terminal connected through a wired/wireless link (for example, CarPlay or Android Auto) may also be used as a navigation database.

The navigation driver 364 constitutes a navigation screen on the display 214 using data provided from the navigation database 362. To this end, the navigation driver 364 receives navigation setting information such as a destination, a "stopover" location, and a route option that a passenger sets from the controller 312. In addition, the navigation driver 364 receives the current position information of the vehicle 100 which is obtained through a communication with GPS satellites from the controller 312 for implementing the navigation.

The audio/video input portion 372 may include an optical disc drive.

Alternatively, the audio/video input portion 372 may include a USB input/output device or an auxiliary (AUX) input/output terminal. Alternatively, the audio/video input portion 372 may include a Bluetooth device for wirelessly connecting with a mobile terminal. The mobile terminal connected to the audio/video input portion 372 through the Bluetooth may include a mobile phone or a portable digital audio player.

The audio/video player 374 outputs audio/video data which are input through the audio/video input portion 372 through the speaker 216 or the display 214. For example, when the audio/video input portion 372 includes an optical disc drive, the optical disc drive decodes audio/video data written on an optical disc (e.g., a compact disc (CD), a DVD, a blue-ray disc (BD), etc.) to extract the audio/video data, and the audio/video player 374 converts the audio/video data extracted by the audio/video input portion 372 into a signal which can drive the speaker 216 or the display 214 and transmits to the speaker 216 or the display 214 so that the audio/video can be reproduced. Even when audio/video data are provided from other medium besides the optical disc, the audio/video data may be converted into a signal which can drive the speaker 216 or the display 214 by being processed by the audio/video player 374.

An input portion 382 may include at least one button or a touch screen implemented on the display 214 provided on the AVN 200. A passenger may set various settings to select one function among the multiple functions of the AVN 200 by operating the input portion 382 and to have the expected operation performed due to the selected function. The above-described voice recognition button 204 of the steering wheel 202 may also be included in at least one button constituting the input portion 382.

The communication port 392 may include, for example, a USB port, a fire wire port, or the like. By having a communication cable inserted into the communication port 392, the AVN 200 may be connected to an external device 250 connected to the communication cable to be capable of communication. In addition, the communication port 392 may be for a near field communication such as Bluetooth, Wi-Fi, Zigbee, and near field communication (NFC). The communication port 392 for the near field communication receives a remote control signal transmitted from a mobile device (for example, a smartphone, a tablet, and the like) and transmits them to the controller 312 of the AVN 200 or another electronic control unit (ECU). Here, the remote control signal may include a remote control signal for locking/releasing doors 190 of the vehicle 100 or a remote control signal for starting/stopping an engine.

The controller 312 performs needed controls of all operations of the AVN 200. For example, the controller 312 responds to an operation of the voice recognition button 204 to drive an application related to a voice recognition function in the memory 310 to have an initial start screen displayed and a related voice introduction message output. In addition, the controller 312 receives voice command information from the voice recognition processor 308 and generates a control command corresponding to the voice command information to have a control corresponding to the voice command information performed. In addition, the controller 312 may perform a broadcast/communication signal processing. When audio/video data generated after processing a broadcast/communication signal have to be output to the speaker 216 or the display 214, the controller 312 may control the transmission of the corresponding audio/video data to the speaker 216 or the display 214 to output the needed audio/video data. In addition, when a passenger selects a navigation function, the controller 312 may control the navigation database 362, the navigation driver 364, the display 214, and the speaker 216 to implement the navigation function. In addition, the controller 312 may perform a control such that audio/video data input from the audio/video input portion 372 is reproduced by the audio/video player 374 and transmitted to the speaker 216 or the display 214 so that the needed audio/video data are output. In addition, the controller 312 converts a name of a broadcast channel extracted from a broadcast signal by the tuner 354 into text and transmits to the voice recognition processor 308.

The memory 310 stores various applications implemented for performing each of the voice recognition function, the broadcast/communication function, the navigation function, and the audio/video function of the AVN 200 as well as screen display data, voice data, sound effect data, and the like needed for driving the applications.

The display 214 outputs videos displayed when the multiple functions such as the voice recognition function, the broadcast/communication function, the navigation function, and the audio/video function of the AVN 200 are performed.

For example, an introduction screen, a message, or video information of each function is output through the display 214. In addition, the display 214 displays a user interface such that a passenger may operate a plurality of functions of the AVN 200. For example, a user interface that a user operates to perform the navigation function, the broadcast (radio/DMB) function, an air conditioning function, the audio function, and the like provided in the AVN 200 is displayed on the display 214. However, video contents displaying through the display 214 may be limited while the vehicle 100 is running so that a driver focuses on safe driving.

The speaker 216 outputs audio generated when the multiple functions such as the voice recognition function, the broadcast/communication function, the navigation function, and the audio/video function of the AVN 200 are performed. For example, an introductory comment, a sound effect, or audio information of each function is output through the speaker 216.

Figure 4:
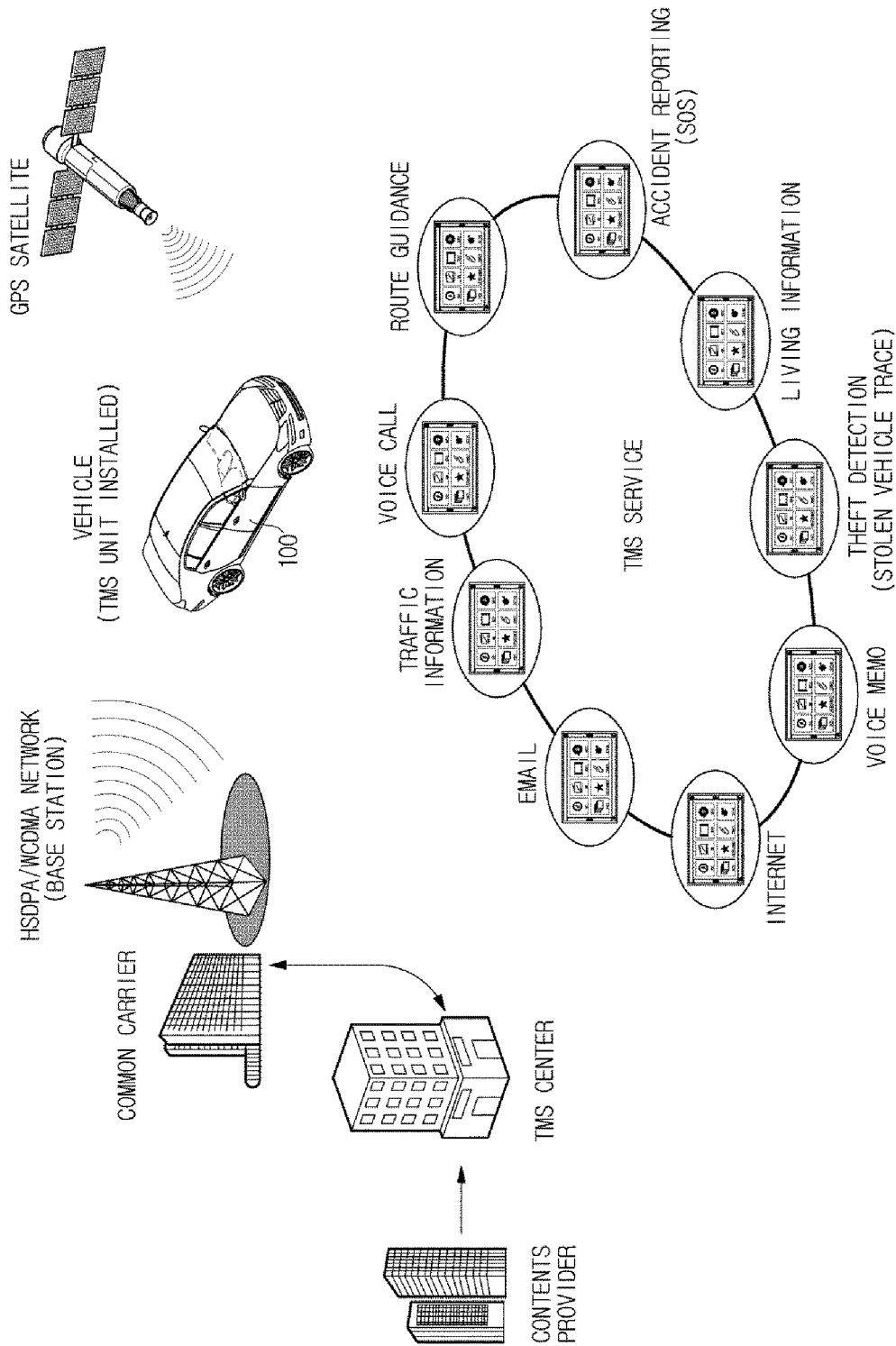
FIG. 4 is a view illustrating a telematics system of the vehicle according to embodiments of the present disclosure.

FIG. 4 is a view illustrating a telematics system of the vehicle according to embodiments of the present disclosure. As illustrated in FIG. 4, a telematics unit (alternately referred to herein as a "TMS unit") for using a telematics service is mounted in the vehicle 100 (e.g., see FIGS. 5 and 502 in FIG. 6). The telematics unit is a device for performing various types of wireless communication as well as also receiving GPS signals from GPS satellites. A configuration of the telematics unit mounted in the vehicle 100 will be further described later with reference to FIGS. 5 and 6.

In the vehicle 100, wireless communication using the telematics unit is performed by the telematics unit accessing a wireless mobile communication base station installed by a common carrier. Wireless mobile communication using the telematics unit is a basis for providing communication services such as voice call, email, the Internet, and voice memo.

In addition, the vehicle 100 which has joined a telematics service may receive various contents from a telematics center (alternately referred to herein as a "TMS Center") through a common carrier. That is, when a partner contents provider provides various contents through a telematics center, the telematics center provides corresponding contents to the member vehicle 100 through a wireless mobile communication network. Contents which can be received through the telematics service may include services such as traffic information, living information, theft detection, accident reporting, and route guidance.

Current position of the vehicle 100 may be identified from GPS signals received from GPS satellites. The current position of the vehicle 100 identified using GPS signals may be used for identifying current position of the vehicle 100 during route guidance by navigation.

Figure 5:
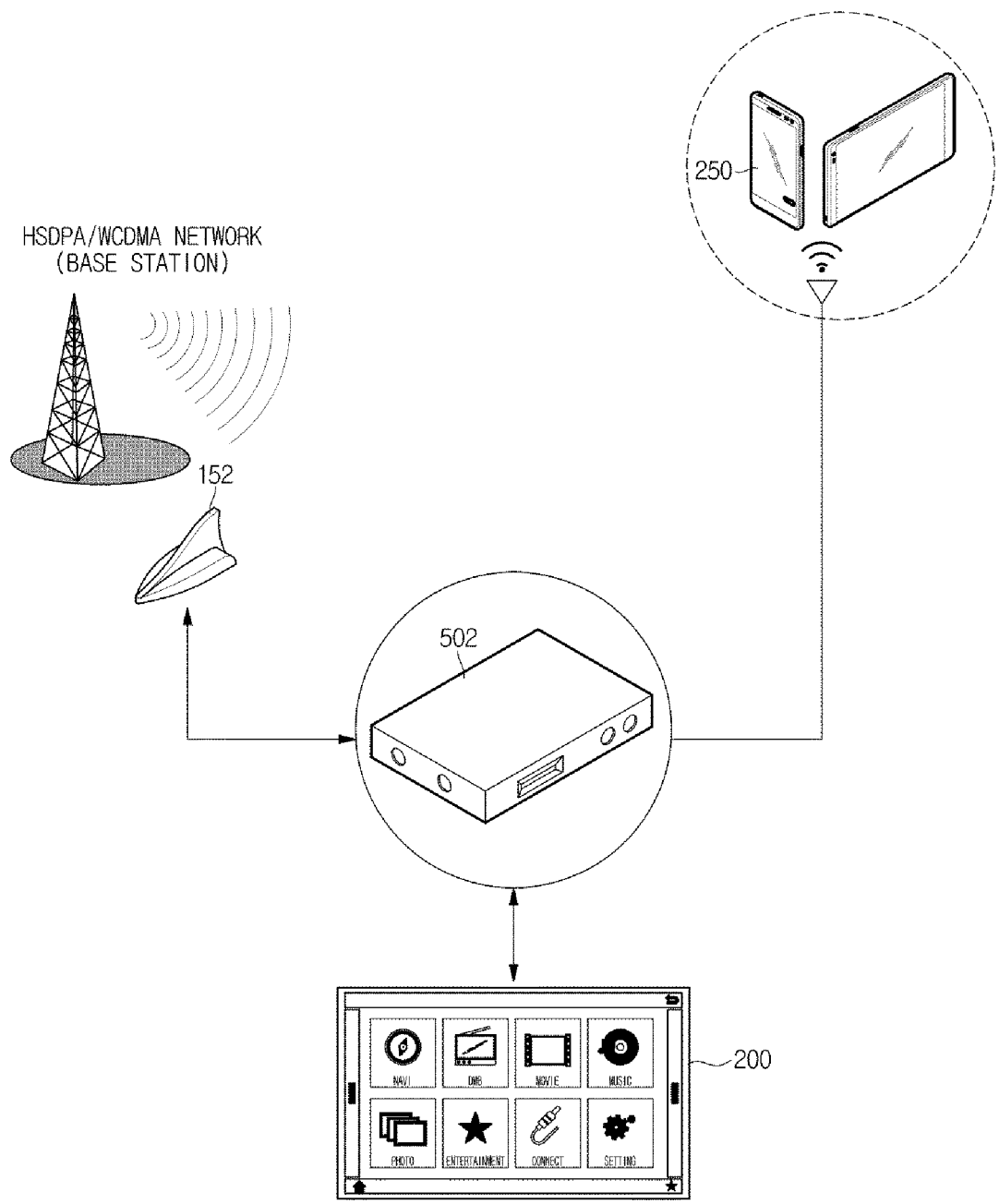
FIG. 5 is a view illustrating a Wi-Fi zone of the vehicle having joined the telematics service.

FIG. 5 is a view illustrating a Wi-Fi zone of the vehicle that has joined the telematics service. In the FIG. 4, it was described that the various services provided by the telematics system of the vehicle 100 include an Internet service. The Internet service in the vehicle 100 is performed by connecting the telematics unit and a wireless mobile communication network.

As illustrated in FIG. 5, by connecting the telematics unit 502 and the wireless mobile communication network, a wireless Internet service in the vehicle 100 may be provided. That is, the telematics unit 502 may operate as a wireless communication repeater (access point (AP)) to form a Wi-Fi zone in the vehicle 100, and passengers in the vehicle 100 may make their terminals (e.g., mobile communication devices, tablets, etc.) access a Wi-Fi channel in the Wi-Fi zone to freely use an Internet environment. A Wi-Fi zone is also referred to as a hotspot. A range of a Wi-Fi zone formed by the telematics unit 502 is not limited to an inner space of the vehicle 100, and the Wi-Fi zone is formed in a predetermined range near the vehicle 100. Accordingly, when vehicles in which Wi-Fi zones are formed are close to one another, communication in a vehicle in a Wi-Fi zone may affect communication in other vehicles in other Wi-Fi zones, and therefore a phenomenon of decreased speed of communication or other performance drawbacks may occur.

Figure 6:
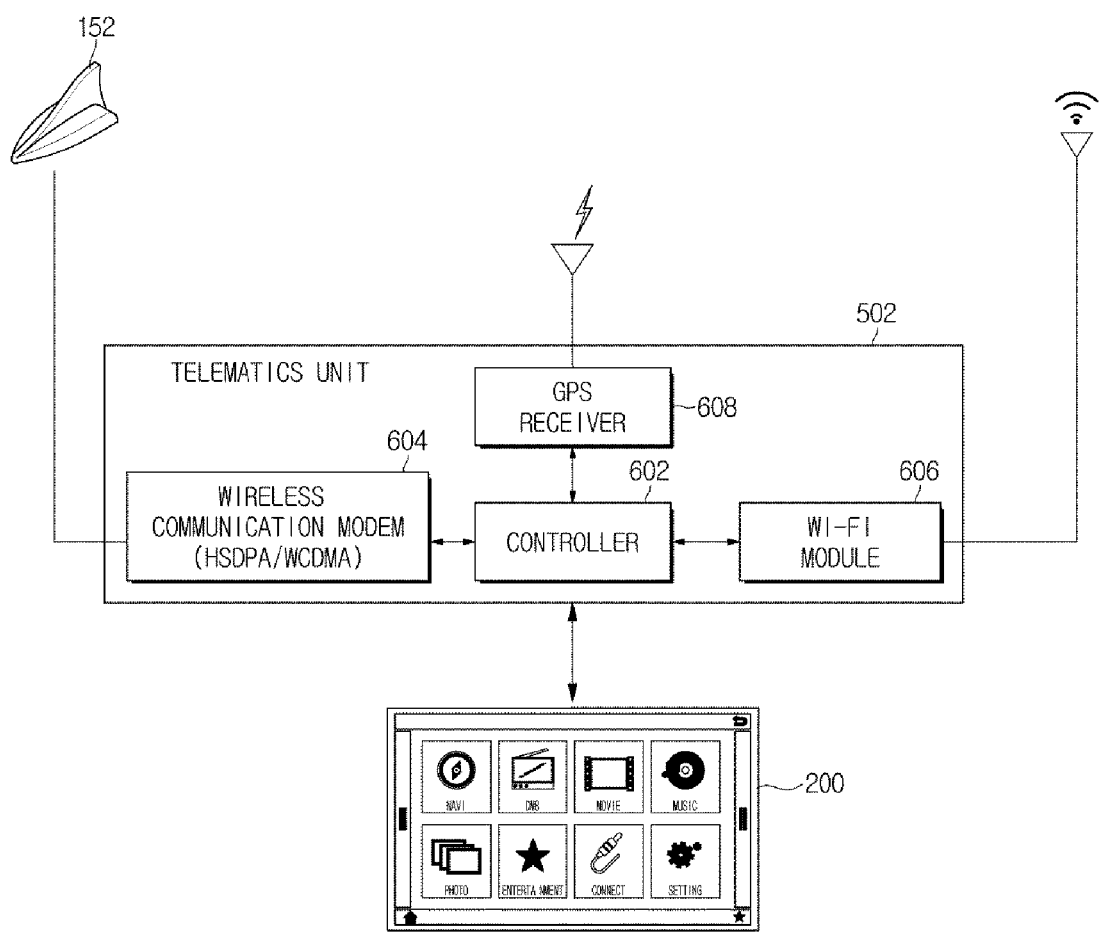
FIG. 6 is a view which shows a configuration of a telematics unit showed in FIG. 5.

FIG. 6 is a view which shows a configuration of a telematics unit shown in FIG. 5. As illustrated in FIG. 6, the telematics unit 502 includes a controller 602, a wireless communication modem 604, a Wi-Fi module 606, (alternatively referred to herein as "Wi-Fi communicater"), and a GPS receiver 608.

The wireless communication modem 604 is provided to access a wireless communication network of a wireless common carrier to be capable of wireless communication via 3G, LTE, etc. Wireless communication performed through the wireless communication modem 604 includes data communication, voice calling, message sending/receiving, and the Internet.

The Wi-Fi module 606 is provided to form a Wi-Fi zone (e.g., hotspot) in and around the vehicle 100. That is, when the Wi-Fi module 606 accesses a wireless communication network through the wireless communication modem 604, the Wi-Fi module 606 operates as one access point (AP) to form a Wi-Fi zone at a predetermined surrounding area. When a Wi-Fi zone is formed by the Wi-Fi module 606, devices which support a Wi-Fi function may access the zone to use the Wi-Fi communication.

The GPS receiver 608 receives GPS signals which are sent from GPS satellites. Here, GPS which is a common name of a satellite navigation system may include all satellite signals of GPS satellites of USA, glonass of Russia, BeiDou of China, and galileo of Europe. Satellite signals which are received by the GPS receiver 608 may be used to identify a position of the vehicle 100 for route guidance by navigation.

The controller 602 of the telematics unit 502 controls all operations of the telematics unit 502. For example, the controller 602 controls the wireless communication modem 604 to form an environment of wireless communication and wireless Internet such as 3G/LTE. In addition, the controller 602 controls the GPS receiver 608 to identify current position of the vehicle 100 and provides the current position information of the vehicle 100 to the AVN 200 which is a multimedia device such that the AVN 200 performs a service such as route guidance. In addition, the controller 602 controls the Wi-Fi module 606 to form a Wi-Fi zone (hotspot) in and around the vehicle 100.

Figure 7:
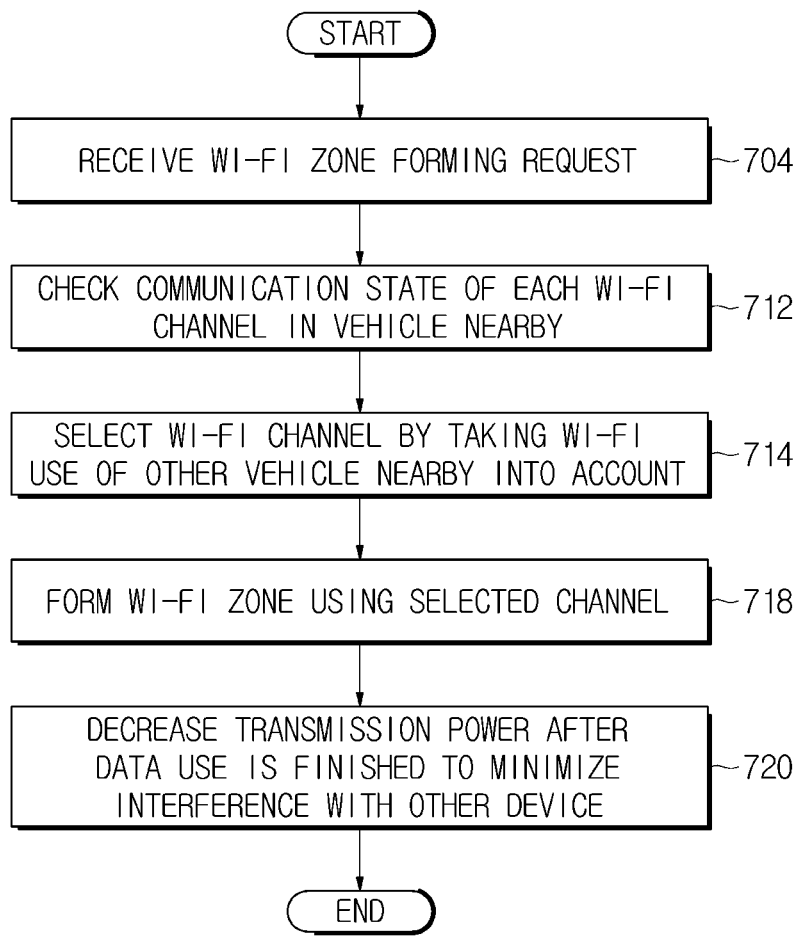
FIG. 7 is a view which shows a Wi-Fi communication control method according to embodiments of the present disclosure.

FIG. 7 is a view which shows a Wi-Fi communication control method according to embodiments of the present disclosure.

First, the controller 602 of the telematics unit 502 may receive a Wi-Fi zone forming request (704). The Wi-Fi zone forming request may be generated through the external device 250 attempting to access the Wi-Fi. The external device 250 may include a device having a Wi-Fi module. The Wi-Fi zone forming request may also be generated by operating a physical key provided in the vehicle 100 having a function used for the Wi-Fi zone forming request or a software key. The Wi-Fi zone forming request may also be generated through a voice command input through the voice recognition function.

The controller 602 of the telematics unit 502 which received the Wi-Fi zone forming request determines a communication state of each Wi-Fi channel near the vehicle 100 through scanning Wi-Fi channels (712). The determination of the communication state of each Wi-Fi channel will be described with reference to FIGS. 8 and 9.

Figure 8:
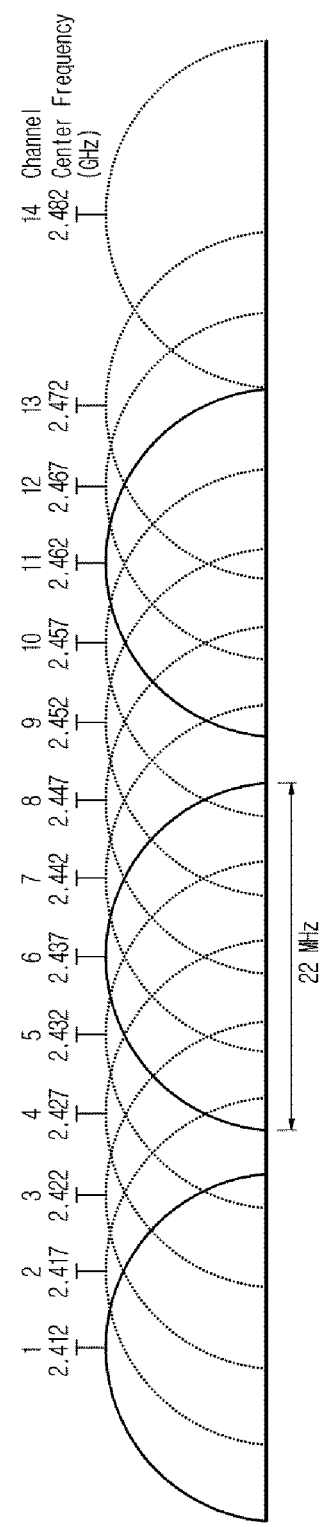
FIG. 8 is a view which shows a Wi-Fi signal of a 2.4 GHz frequency band.

First, FIG. 8 is a view which shows a Wi-Fi signal of a 2.4 GHz frequency band. Wi-Fi signals in a 2.4 GHz frequency band shown in FIG. 8 is a standard standardized in 802.11n. Wi-Fi signals in a 5 GHz frequency band are standardized in 802.11ac.

As illustrated in FIG. 8, all of the Wi-Fi signals in the 2.4 GHz frequency band are included in fourteen channels. Each of the channels corresponds to an intermediate frequency different from each other. The intermediate frequency of channel 1 is 2. 412 GHz, the intermediate frequency of channel 2 is 2. 417 GHz, and the intermediate frequency of channel 3 is 2. 422 GHz. As described above, each channel is increased by 0. 005 GHz, and thus the intermediate frequency of channel 14 becomes 2. 484 GHz. A frequency bandwidth of each channel is 22 MHz.

Transmission power (that is, strength of signal) of each Wi-Fi signal of the 2.4 GHz frequency band in FIG. 8 is the same, this corresponds to a case in which all use environments of the channels are assumed to be the same which is a very ideal case. In reality, since actual signal strength of each channel may be different depending on communication environments, there is a need to select a channel by taking the current communication state into account.

Figure 9:
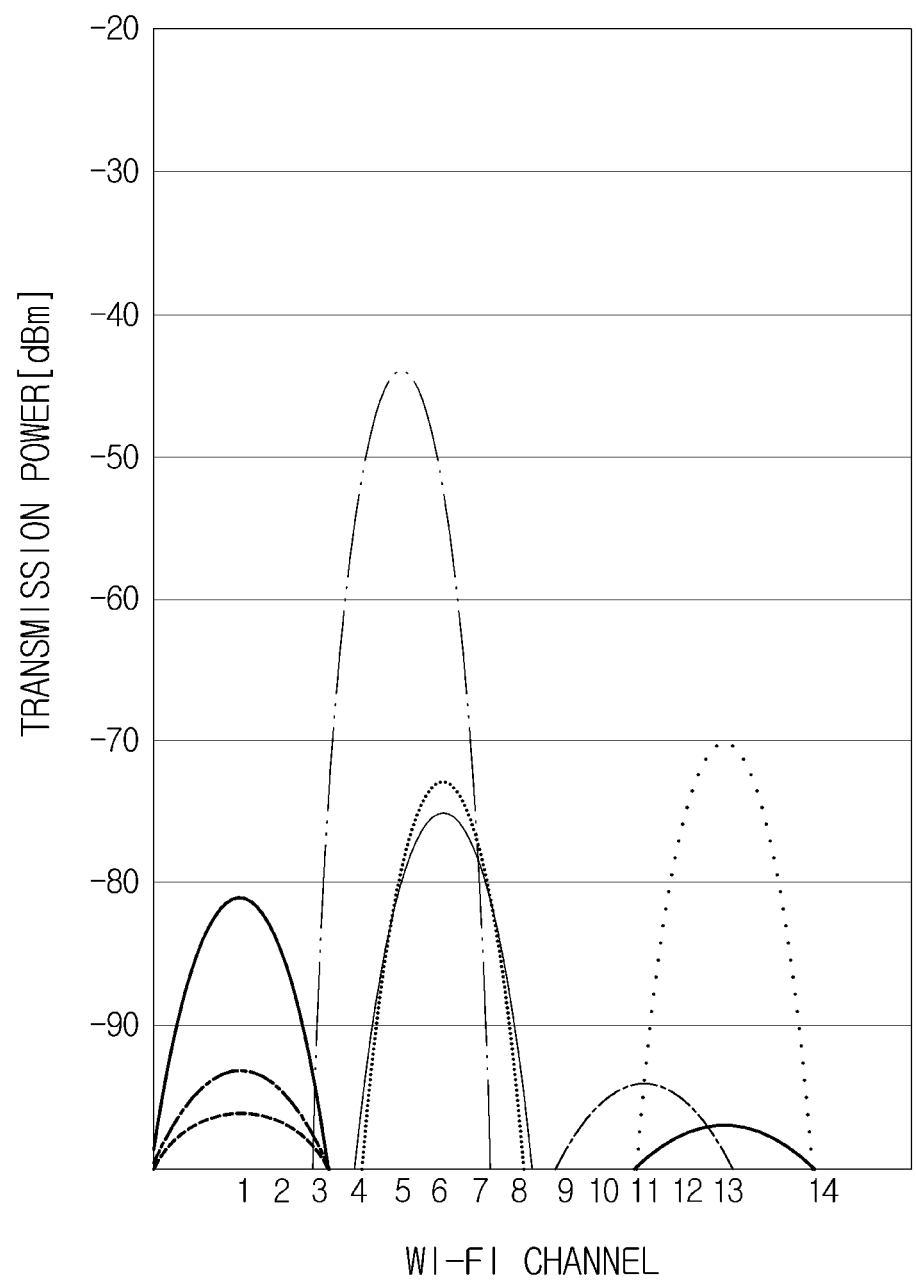
FIG. 9 is a view which shows one example of communication states of each channel of the Wi-Fi signal of the 2.4 GHz frequency band.

FIG. 9 is a view which shows one example of communication states of each channel of the Wi-Fi signal of the 2.4 GHz frequency band.

As illustrated in FIG. 9, while parts of the fourteen channels are in use, there may also be channels which are not in use.

In FIG. 9, a first channel is accessed by three devices, and transmission power of each of the devices are signal strengths of about −81 dBm, −93 dBm, and −96 dBm. The total transmission power of the first channel is −270 dBm. A fifth channel is connected by one device, and the transmission power is about −44 dBm. Accordingly, the total transmission power of the fifth channel is −44 dBm. A sixth channel is accessed by two devices, transmission power for each of the devices are −73 dBm, and −75 dBm, and the total transmission power is −148 dBm. An eleventh channel is accessed by one device, a signal strength is −94 dBm. Accordingly, the total transmission power of the eleventh channel is −94 dBm. A thirteenth channel is accessed by two devices, transmission power for each of the devices are about −70 dBm, and −97 dBm, and the total is −167 dBm.

By determining communication states of the Wi-Fi channels as illustrated in FIG. 9, the number of devices accessing each of the Wi-Fi channels and total transmission power of each of the channels may be obtained. In the embodiment of the present disclosure, the communication state of each Wi-Fi channel is determined, interference with other devices near the vehicle 100 which uses communication is minimized, a channel in which lower power is used is selected for obtaining faster Wi-Fi communication in the vehicle 100, and a Wi-Fi zone is formed using the selected channel.

It is preferable to select a Wi-Fi channel having less communication load. To this end, an unoccupied channel which is currently not used may also be selected. When there is no unoccupied channel, a channel which transmits the minimum power may be selected. Since the minimum transmission power means that the number of devices accessing the corresponding Wi-Fi channel, or a communication load thereof is the lowest, when the channel which transmits the minimum power is selected to form a Wi-Fi zone, a faster and more stable Wi-Fi zone may be formed.

For example, three adjacent channels [N, N+1, N+2] among fourteen channels constituting the Wi-Fi signals in the 2.4 GHz frequency band is set as one group. That is, each channel is grouped by three channels such as [1, 2, 3], [2, 3, 4], [3, 4, 5], . . . , and [12, 13, 14] to form twelve groups of three. A group in which transmission power is the lowest among the grouped twelve groups is selected, and the middle channel of the selected group is selected to form a Wi-Fi zone. When the group [8, 9, 10] has the lowest total transmission power among the fourteen groups, the ninth channel which is the middle channel of the group is selected to form a Wi-Fi zone.

In FIG. 7, the controller 602 of the telematics unit 502 selects a Wi-Fi channel which has a smaller communication load by determining a communication state of each Wi-Fi channel near the vehicle 100 (714). Since the communication state of each Wi-Fi channel may be determined by scanning of Wi-Fi channels, a channel which has a comparatively small communication load is selected such that a faster communication speed may be obtained.

When one Wi-Fi channel which has a comparatively small communication load is selected according to the above-described base, the controller 602 of the telematics unit 502 forms a Wi-Fi zone using the selected Wi-Fi channel (718). When the Wi-Fi zone is formed using the selected Wi-Fi channel, the external device 250 that a passenger in the vehicle 100 has may access the Wi-Fi zone formed in the vehicle 100 to use a wireless communication service.

When there is no external device 250 accessing the Wi-Fi zone formed in the vehicle 100 (that is, data use is finished or terminates), the controller 602 of the telematics unit 502 decreases transmission power of a corresponding channel to minimize interference with Wi-Fi communication of other vehicles near the vehicle 100 (720). When the high transmission power for the Wi-Fi communication is maintained even after the data use terminates, since the transmission power may interfere with the other Wi-Fi channels formed in other vehicles near the vehicle 100, it is preferable to decrease the transmission power of the corresponding channel used for forming the Wi-Fi zone of the vehicle 100.

Figure 10:
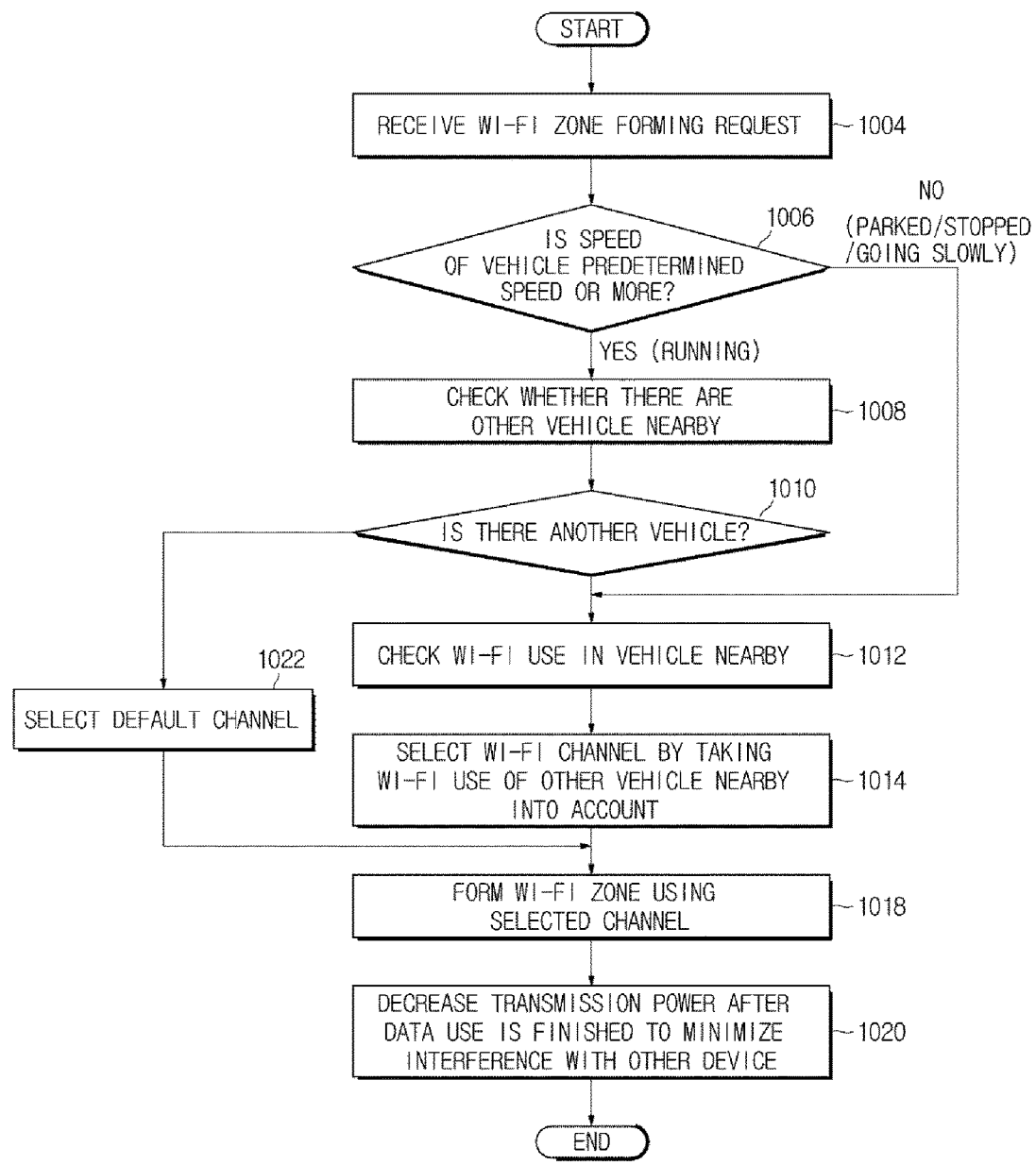
FIG. 10 is a view which shows an additional Wi-Fi communication control method according to embodiments of the present disclosure.

FIG. 10 is a view which shows an additional Wi-Fi communication control method according to embodiments of the present disclosure. In a Wi-Fi communication control method illustrated in FIG. 10, a Wi-Fi zone is formed using different methods depending on whether the vehicle 100 is running or not running.

First, a controller 602 of a telematics unit 502 may receive a Wi-Fi zone forming request (1004). The Wi-Fi zone forming request may be generated by an external device 250 attempting to access Wi-Fi. The external device 250 may be a device including a Wi-Fi module. The Wi-Fi zone forming request may also be generated by operating a physical key provided in the vehicle 100 and having a function used for the Wi-Fi zone forming request or a software key. The Wi-Fi zone forming request may also be generated through a voice command input through a voice recognition method.

The controller 602 of the telematics unit 502 which received the Wi-Fi zone forming request determines whether a speed of the vehicle 100 is a predetermined speed or more before forming a Wi-Fi zone (1006). The determination of the speed of the vehicle 100 is for determining whether the vehicle 100 is running. In the embodiment of the present disclosure, processes of forming a Wi-Fi zone may vary depending on whether the vehicle 100 is running or not running. When a speed of the vehicle 100 is a predetermined speed (for example, 30 km/h) or more, the controller 602 of the telematics unit 502 recognizes that the vehicle 100 is running. When a speed of the vehicle 100 is less than a predetermined speed, the controller 602 of the telematics unit 502 recognizes that the vehicle 100 is parked, stopped, or going slowly (that is, not running). A predetermined speed may be an average speed of cases when the vehicle 100 repeats a stop and a delay due to an unsmooth traffic flow caused by, for example, heavy traffic, accidents, etc. When the vehicle 100 is running equal to or faster than a predetermined speed, a relative distance between the vehicle 100 and other vehicles nearby is comparatively long for securing a safe distance and the like. On the other hand, when the vehicle 100 is running slower than a predetermined speed, many vehicles maintain close distances with one another and gather together due to a traffic congestion.

In embodiments of the present disclosure, when the vehicle 100 is running, a process of determining whether there are other vehicles near the vehicle 100 is performed using a detection method provided in the vehicle 100. On the other hand, when the vehicle 100 is not running, the process of determining whether there are other vehicles near the vehicle 100 is omitted and a process of determining a Wi-Fi communication state near the vehicle 100 is directly performed. As described above, when the vehicle 100 is running, by omitting the process of determining whether there are other vehicles nearby, time taken to form a Wi-Fi zone may be decreased accordingly.

When a speed of the vehicle 100 is a predetermined speed or more ('yes' in 1006), whether there are other vehicles near the vehicle 100 (1008) is determined. That is, when the vehicle 100 is running, since there may or may not be other vehicles at close distance to the running vehicle 100, whether there are other vehicles near the vehicle 100 needs to be determined using a detection method provided in the vehicle 100. A method to determine whether there are other vehicles near the vehicle 100 is illustrated in FIG. 11.

FIG. 11 is a view which shows a method which determines whether other vehicles are near a vehicle 100 using a detection method provided in the vehicle 100. The detection method in FIG. 11 may include a smart cruise control system. The smart cruise control system is a system to control the vehicle 100 to maintain a set running speed even without a driver operating an accelerator pedal while driving when the driver sets a desired speed in an instrument panel cluster. When an obstacle (e.g., another vehicle, a pedestrian, a construction, or the like) are detected in front of the vehicle 100, a safe distance may be automatically maintained by adjusting a distance between the vehicle 100 and the obstacle, and a speed of the vehicle may be further actively decreased or the vehicle may stop by braking as necessary. FIG. 11(A) is view which shows a case when other vehicles 1104 near the vehicle 100 are positioned comparatively far from the vehicle 100, and FIG. 11(B) is a case when other vehicles 1104 near the vehicle 100 are positioned at comparatively close distances from the vehicle 100.

In the embodiment of the present disclosure, the determination of whether there are other vehicles 1104 near the vehicle 100 is for forming a Wi-Fi zone in the vehicle 100 with an optimum channel. Accordingly, it is preferable to determine whether there are other vehicles 1104 in a region in which a Wi-Fi channel is detected around the telematics unit 502 of the vehicle 100.

As illustrated in FIGS. 11(A) and 11(B), the running vehicle 100 may recognize other vehicles 1104 using the smart cruise control system. When the vehicle 100 is running in a lane on a road, whether there are other vehicles 1104 in front of the vehicle 100 may be determined through a distance measurement method of the smart cruise control system (for example, a radar) installed in the vehicle 100. When a distance measurement method is installed at a rear of the vehicle 100, whether there are other vehicles 1104 in the backward direction of the vehicle 100 may also be determined.

In FIG. 10, when there are other vehicles near the vehicle 100 ('yes' in 1010), the controller 602 of the telematics unit 502 determines a communication state of each Wi-Fi channel near the vehicle 100 through Wi-Fi channel scanning (1012). The determination of the communication state of each Wi-Fi channel has been previously described through FIGS. 8 and 9.

The controller 602 of the telematics unit 502 considers a communication state of each Wi-Fi channel near the vehicle 100 to select a Wi-Fi channel having a further smaller communication load (1014). Since a communication state of each Wi-Fi channel may be known through Wi-Fi channel scanning, a channel is selected, on which a faster communication speed may be obtained because of a lower communication load.

When one Wi-Fi channel is selected which has a lower communication load, the controller 602 of the telematics unit 502 forms a Wi-Fi zone using the selected Wi-Fi channel (1018). When the Wi-Fi zone is formed using the selected Wi-Fi channel, an external device 250 that a passenger in the vehicle 100 has may access the Wi-Fi zone formed in the vehicle 100 to use a wireless communication service.

When there is no external device 250 in the Wi-Fi zone formed in the vehicle 100 (that is, use of data is finished or terminates), the controller 602 of the telematics unit 502 decreases transmission power of the corresponding channel to minimize interference with Wi-Fi communication of other vehicles near the vehicle 100 (1020). When the high transmission power for the Wi-Fi communication is maintained even after the use of data terminates, since the transmission power may interfere with the other Wi-Fi channels formed in other vehicles near the vehicle 100, it is preferable to decrease the transmission power of the corresponding channel used for forming the Wi-Fi zone of the vehicle 100.

In the above-described process 1010, when there is no other vehicle near the vehicle 100 ('no' in 1010), a Wi-Fi zone is formed by selecting a default channel determined according to a predetermined rule (1022). Since a case in which there is no other vehicle near the running vehicle 100 means that there is no device accessing Wi-Fi communication near the running vehicle 100, a process for determining Wi-Fi use states of other devices to select an optimum channel may be omitted, a default channel determined according to a predetermined rule may be directly selected, and thus a time that it takes to form a Wi-Fi zone may be further decreased.

Figure 12:
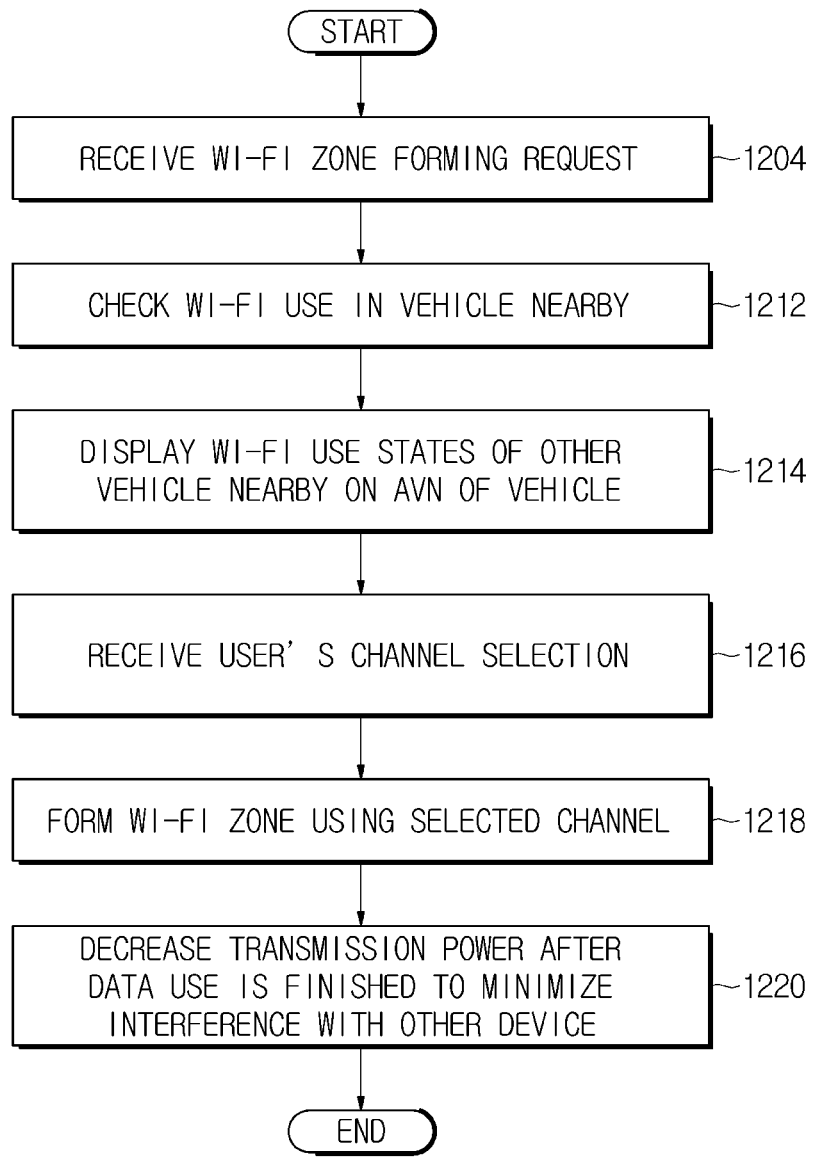
FIG. 12 is a view which shows another Wi-Fi communication control method according to embodiments of the present disclosure.

FIG. 12 is a view which shows an additional Wi-Fi communication control method according to embodiments of the present disclosure. A Wi-Fi communication control method in FIG. 12 controls such that a determination result of Wi-Fi communication states is displayed on a display 214 of an AVN 200 which is a multimedia device, a user (e.g., driver) directly confirms the Wi-Fi communication states displayed on the display 214 and selects a Wi-Fi channel that the user wants, and thus a Wi-Fi zone is formed using the channel selected by the user.

First, the controller 602 of the telematics unit 502 may receive a Wi-Fi zone forming request (1204). The Wi-Fi zone forming request may be generated by an external device 250 attempting to access Wi-Fi. The external device 250 may be a device including a Wi-Fi module. The Wi-Fi zone forming request may also be generated by operating a physical key provided in the vehicle 100 having a function used for the Wi-Fi zone forming request or a software key. The Wi-Fi zone forming request may also be generated through a voice command input through a voice recognition method.

The controller 602 of the telematics unit 502 which received the Wi-Fi zone forming request determines a communication state of each Wi-Fi channel near the vehicle 100 through Wi-Fi channel scanning (1212). The determining of the communication state of each Wi-Fi channel has been previously described through FIGS. 8 and 9.

Through the determining of the communication state of each Wi-Fi channel as illustrated in FIG. 9 previously described, the number of devices accessing each of Wi-Fi channels and a sum of transmission power of the each of the Wi-Fi channels may also be known. In another embodiment of the present disclosure illustrated in FIG. 12, the controller 602 of the telematics unit 502 determines the above-described communication state of the each of the Wi-Fi channels to display a determination result on a display 214 of an AVN 200 which is a multimedia device (1214). This is shown in FIG. 13.

Figure 13:
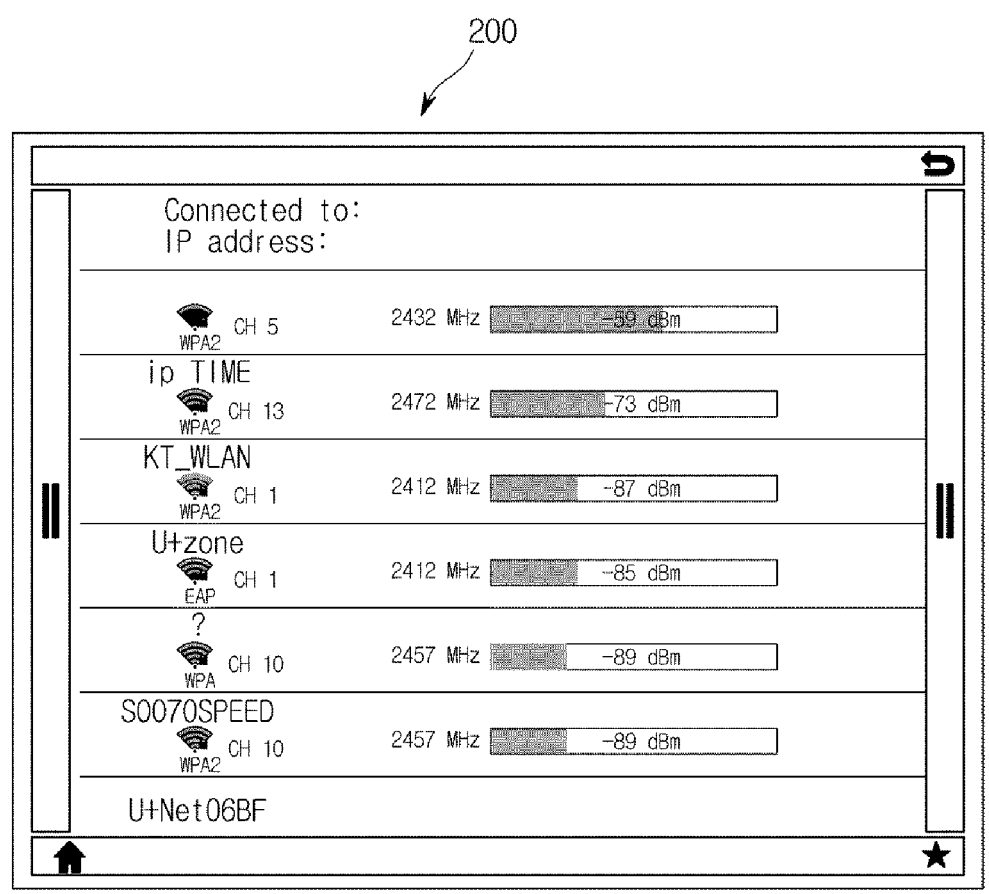
FIG. 13 is a view which shows a determination result of a use state of Wi-Fi channels in a display of an AVN.

FIG. 13 is a view which shows a determination result of a use state of Wi-Fi channels in a display 214 of an AVN 200. As illustrated in FIG. 13, as information of communication states of Wi-Fi channels near the vehicle 100 is displayed on the display 214 of the AVN 200, a driver or other passengers may visually determine this to select a channel that the driver or the other passengers want. The information of the communication state of each Wi-Fi channel displayed on the display 214 of the AVN 200 may include an access point name, a channel being used, a magnitude of transmission power, a frequency band, and the like.

In FIG. 12, the driver (or other passengers) in the vehicle 100 may confirm the information of the communication state of each of the Wi-Fi channels displayed on the display 214 of the AVN 200 and select a specific Wi-Fi channel that the driver or the other passengers want by touching the display 214, and thus a Wi-Fi zone may be formed using the selected channel. The controller 602 of the telematics unit 502 may receive a Wi-Fi channel selection of the driver or the other passengers (1216) and may form a Wi-Fi zone using the selected channel (1218).

When there is no external device 250 accessing a Wi-Fi zone formed in the vehicle 100 (that is, data use is finished or terminates) the controller 602 of the telematics unit 502 decreases transmission power of a corresponding channel to minimize interference with Wi-Fi communication of other vehicles near the vehicle 100 (1220). When the high transmission power for the Wi-Fi communication is maintained even after the data use terminates, since the transmission power may interfere with the other Wi-Fi channels formed in other vehicles near the vehicle 100, it is preferable to decrease the transmission power of the corresponding channel used for forming the Wi-Fi zone of the vehicle 100.

As is apparent from the above description, when a Wi-Fi zone is formed in a vehicle, because the Wi-Fi zone is formed by selecting a channel having a lower communication load by taking a communication state of each Wi-Fi channel near the vehicle into account, an interference due to communication states of other Wi-Fi zones is minimized, and thus Wi-Fi communication can be faster and more stable.

The above description is only an example describing a technological scope of the present disclosure. Various changes, modifications, and replacements may be made without departing from the spirit and scope of the present disclosure by those skilled in the art. Therefore, the embodiments disclosed above and in the accompanying drawings should be considered in a descriptive sense only and not for limiting the technological scope. The technological scope of the present disclosure is not limited by these embodiments and the accompanying drawings. The spirit and scope of the present disclosure should be interpreted by the appended claims and encompass all equivalents falling within the scope of the appended claims.

What is claimed is:

1. A Wireless-Fidelity (Wi-Fi) communication control method of a vehicle, the method comprising:
   determining a Wi-Fi communication state of the vehicle at a current position;
   selecting a Wi-Fi channel among n Wi-Fi channels having a low communication load according to the Wi-Fi communication state of the vehicle at the current position;
   forming a Wi-Fi zone in the vehicle using the selected Wi-Fi channel; and
   decreasing transmission power of the selected Wi-Fi channel when data use of a device accessing the Wi-Fi zone terminates,
   wherein n is three, and a middle Wi-Fi channel among the three Wi-Fi channels is the selected Wi-Fi channel.

2. The Wi-Fi communication control method of a vehicle claim 1, wherein the determining of the Wi-Fi communication state comprises determining an amount of use in each of a plurality of Wi-Fi channels.

3. The Wi-Fi communication control method of a vehicle claim 2, further comprising determining the amount of use in each of the plurality of Wi-Fi channels based on at least one of transmission power and a number of devices accessing each of the plurality of Wi-Fi channels.

4. The Wi-Fi communication control method of a vehicle claim 2, further comprising selecting a Wi-Fi channel among the plurality of Wi-Fi channels having a lowest amount of use.

5. The Wi-Fi communication control method of a vehicle claim 2, further comprising:
   grouping n individual Wi-Fi channels adjacent to each other among the plurality of Wi-Fi channels to form a plurality of channel groups;
   selecting a channel group among the plurality of channel groups having a lowest amount of use; and
   selecting one Wi-Fi channel in the selected channel group.

6. A Wi-Fi communication control method of a vehicle, the method comprising:
   determining whether the vehicle is running;
   determining whether another vehicle is near the vehicle when the vehicle is running;
   determining a Wi-Fi communication state of the vehicle at a current position when the vehicle is running and another vehicle is near the vehicle;
   selecting a Wi-Fi channel having a low communication load according to the Wi-Fi communication state at the current position; and
   forming a Wi-Fi zone using the selected Wi-Fi channel, wherein, when the vehicle is not running, the determining of whether another vehicle is near the vehicle is not performed.

7. The Wi-Fi communication control method of a vehicle of claim 6, further comprising forming the Wi-Fi zone using a predetermined default Wi-Fi channel when the vehicle is running and there is no vehicle near the running vehicle.

8. The Wi-Fi communication control method of a vehicle of claim 6, wherein the determining of the Wi-Fi communication state comprises determining an amount of use in each of a plurality of Wi-Fi channels.

9. The Wi-Fi communication control method of a vehicle of claim 8, further comprising determining the amount of use in each of the plurality of Wi-Fi channels based on at least one of transmission power and a number of devices accessing each of the plurality of Wi-Fi channels.

10. The Wi-Fi communication control method of a vehicle of claim 8, further comprising selecting a Wi-Fi channel among the plurality of Wi-Fi channels having a lowest amount of use.

11. The Wi-Fi communication control method of a vehicle of claim 8, further comprising:
grouping n Wi-Fi channels adjacent to each other among the plurality of Wi-Fi channels to form a plurality of channel groups;
selecting a channel group among the plurality of channel groups having a lowest amount of use; and
selecting one Wi-Fi channel in the selected channel group.

12. The Wi-Fi communication control method of a vehicle claim 11, wherein n is three, and the middle Wi-Fi channel among the three Wi-Fi channels in the selected channel group is selected.

13. The Wi-Fi communication control method of a vehicle claim 6, further comprising decreasing transmission power of the selected Wi-Fi channel when data use of a device accessing the Wi-Fi zone terminates.

14. A Wi-Fi communication control method of a vehicle, comprising:
determining a communication state of each Wi-Fi channel of the vehicle at a current position;
displaying each Wi-Fi channel and the communication state of each Wi-Fi channel using a display in the vehicle;
receiving a selection of a Wi-Fi channel among the displayed Wi-Fi channels, the selected Wi-Fi channel being one of n Wi-Fi channels;
forming a Wi-Fi zone using the selected Wi-Fi channel; and
decreasing transmission power of the selected Wi-Fi channel when data use of a device accessing the Wi-Fi zone terminates,
wherein n is three, and a middle Wi-Fi channel among the three Wi-Fi channels is the selected Wi-Fi channel.

15. The Wi-Fi communication control method of a vehicle of claim 14, wherein the determining of the Wi-Fi communication state comprises determining an amount of use in each of a plurality of Wi-Fi channels.

16. The Wi-Fi communication control method of a vehicle of claim 15, further comprising determining the amount of use in each of the plurality of Wi-Fi channels based on at least one of transmission power and a number of devices accessing each of the plurality of Wi-Fi channels.

17. A vehicle comprising:
a Wi-Fi communicator performing Wi-Fi communication; and
a controller determining a Wi-Fi communication state of the vehicle at a current position,
selecting a Wi-Fi channel among n Wi-Fi channels having a low communication load
according to the Wi-Fi communication state of the vehicle at the current position, forming a Wi-Fi zone using the selected Wi-Fi channel, and decreasing transmission power of the selected Wi-Fi channel when data use of a device accessing the Wi-Fi zone terminates,
wherein n is three, and a middle Wi-Fi channel among the three Wi-Fi channels is the selected Wi-Fi channel.

* * * * *